United States Patent [19]

Aoyama

[11] 4,135,330
[45] Jan. 23, 1979

[54] ROOF-GARDEN

[76] Inventor: Masahiko Aoyama, 12, Kakuozandori-6-chome, Chikusa-ku, Nagoya-shi, Aichi-ken, Japan

[21] Appl. No.: 841,949

[22] Filed: Oct. 13, 1977

[30] Foreign Application Priority Data

Feb. 14, 1977 [JP] Japan .................................. 52-14822

[51] Int. Cl.$^2$ ............................................. A01G 9/00
[52] U.S. Cl. ......................................... 47/1 R; 47/33
[58] Field of Search ............................. 47/33, 39, 1, 9

[56] References Cited

U.S. PATENT DOCUMENTS

| 1,874,029 | 8/1932 | Condon | 47/33 X |
|---|---|---|---|
| 1,924,721 | 8/1933 | Leubuscher | 47/33 X |
| 1,948,026 | 2/1934 | Curtiss | 47/33 X |
| 1,949,063 | 2/1934 | Merrill | 47/33 X |
| 2,215,159 | 9/1940 | Rothmann | 47/33 X |
| 2,436,770 | 2/1948 | Hill et al. | 47/33 |
| 2,632,979 | 3/1953 | Alexander | 47/1 X |
| 3,820,280 | 6/1974 | Gilgen | 47/1 |

FOREIGN PATENT DOCUMENTS 159441  3/1921  United Kingdom ...................... 47/33

Primary Examiner—E.H. Eickholt
Attorney, Agent, or Firm—Jay L. Chaskin

[57] ABSTRACT

A garden laid out on the roof of a building and having a sheet of vinyl spread on the slabbed floor of the roof and extending along the inner surfaces of the walls of the building up to a certain level above the slabbed floor, a space defined by the vinyl sheet covered slabbed floor and an upper concrete layer and filled with leaf mold, a garden earth layer formed on the upper concrete layer, and trees, shrubs, etc. planted in the garden earth layer.

5 Claims, 4 Drawing Figures

ROOF-GARDEN

This invention relates to a roof-garden which is laid out by utilizing the roof of a building.

If abnormal weather prevails and there is no rainfall at all through a long period of time, a spell of rainy weather lasts long, there is no wind, or the temperature becomes inordinatly high or low, the health of man tends to be injured and man becomes infirm and loses vitality, with the result that human activities decline. Especially in large cities, air is greatly polluted by harmful chemical materials produced by the activities of man in society which has become greatly industrialized. There has, particularly in recent years, arisen the problem of air pollution by the exhaust gases emitted from motor vehicles and other noxious gases released to atmosphere as the results of industrial production. Thus, present-day tendencies in large cities are that the health of the citizens is injured and unhealthy atmosphere hastens the death of the sick and the infirm. The population has greatly increased in large cities with the progress of industrial production, with an attendant increase in the number of buildings. An increase in the number of buildings has naturally resulted in a decrease in vacant lots, in a reduction in the number of trees and shrubs, and in increased pollution of rivers, water-ways and ponds. It is a metter of great significance that natural environment, which is most important for human health and activities, is nowadays being destroyed at a high pace.

Under these circumstances, what we human beings most earnestly desire are places with full of trees growing on earth, where we can relax in good surroundings. Heretofore, there have been small parks available in large cities which can be referred to as oases in towns. The small parks on the ground are too small in number to be of use for us to relax in. Moreover, it seldom happens that a small park is available in the neighborhood of our dwellings. Even if the small parks can serve as places where we can relax and rest, the present situation is that they are full of dust and foul air, so that such parks are not good for health to rest in.

In view of the aforementioned current conditions, it is an object of this invention to provide a roof-garden utilizing the roof of a building in order to solve the aforementioned problems, to increase both mental health and physical health of man, and to help man develop vitality with which to lead a significant life.

The roofs of high buildings have hitherto been covered with tents and utilized as beer gardens in the summertime. In winer, however, there has been no opportunity to put the space on the roof of a building to good use, and the flat roofs of buildings are left unutilized. In view of the fact that the prices of lots on which buildings are built in crowded cities are rising day by day, it is uneconomical to leave the roofs of a considerably large area of buildings unutilized as they are. If the roof of a building can be utilized to lay out a roof-garden which can be put to good use throughout the year, an unutilized part of a building can be put to good use, thereby increasing the utility value of the building. The provision of a roof-garden on the roof of a building is significant in this respect also.

Another object of the invention is to provide a roof-garden which can be laid out by utilizing the roof of a building which in now left unutilized, so that the unutilized roof of a building can be put to good use throughout the year over a prolonged period of time.

For accomplishing the above objects, the roof-garden of the present invention comprises; a sheet of vinyl spread on a slabbed floor of a building and extending along inner surfaces of walls of the building up to a certain level above the slabbed floor; a plurality of wooden blocks arranged in a plurality of suitably spaced-apart rows on the vinyl sheet covered floor in such a manner that the wooden blocks of two adjacent rows are arranged in staggered relationship and wooden blocks of each row are spaced apart from one another for a suitable distance; a first earth layer formed in a space containing the wooden blocks; an upper concrete layer provided on said first earth layer; a second earth layer formed on said upper concrete layer; and trees and shrubs planted in said second earth layer.

Additional and other objects and features of the invention will become evident from the description set forth hereinafter when considered in conjunction with the accompanying drawings, in which.

Figure 1:
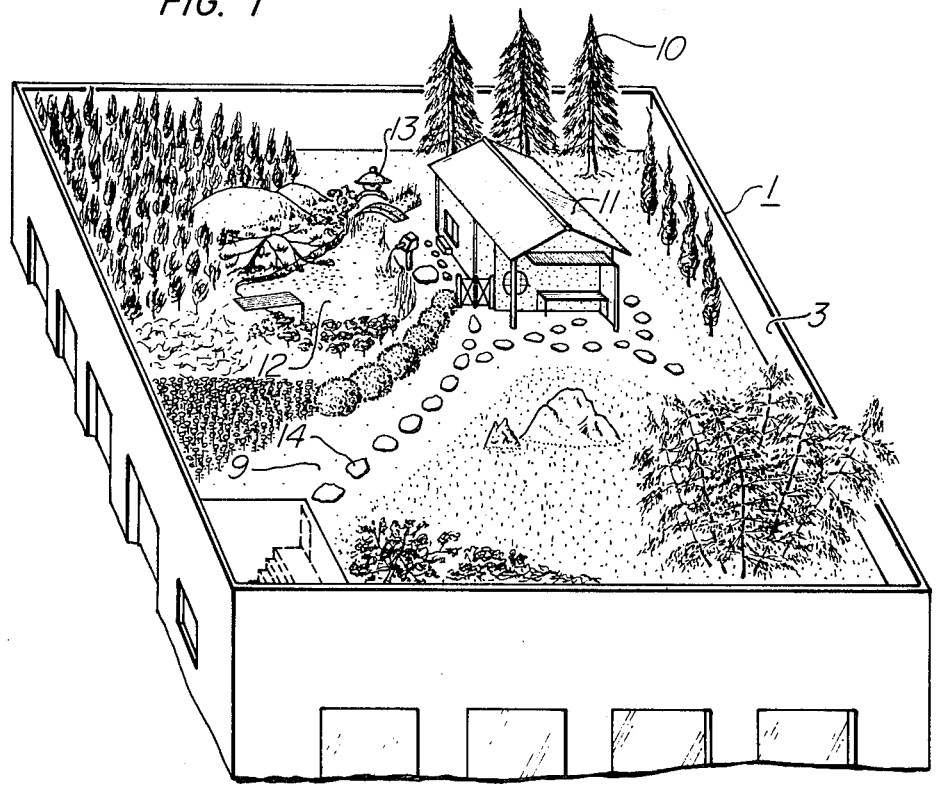
FIG. 1 is a perspective view of the roof-garden according to the invention.
Figure 2:
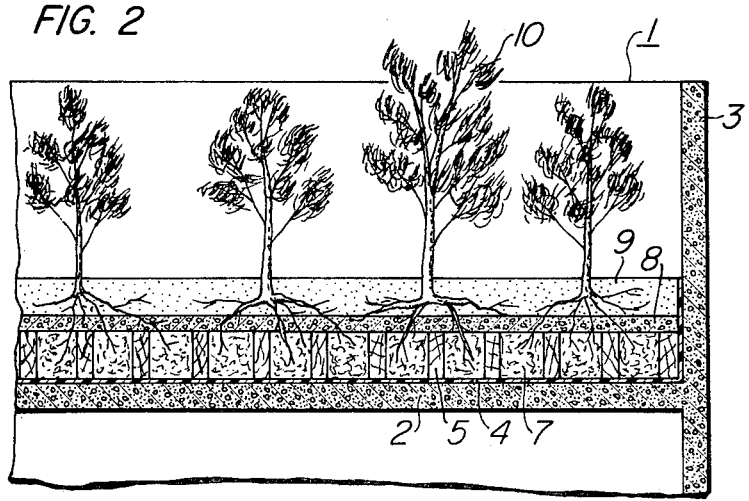
FIG. 2 is a fragmentary vertical sectional view of the roof-garden shown in FIG. 1.
Figure 3:
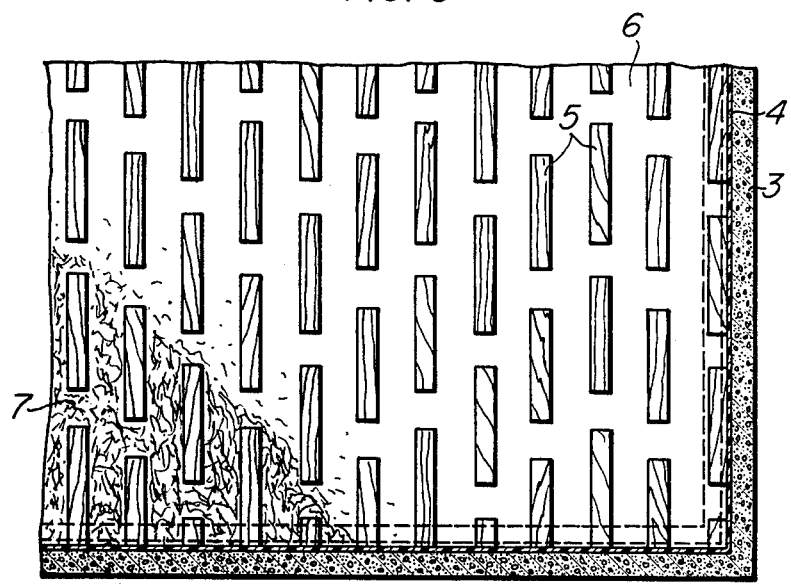
FIG. 3 is a fragmentary transverse sectional view of the roof-garden shown in FIG. 1.
Figure 4:
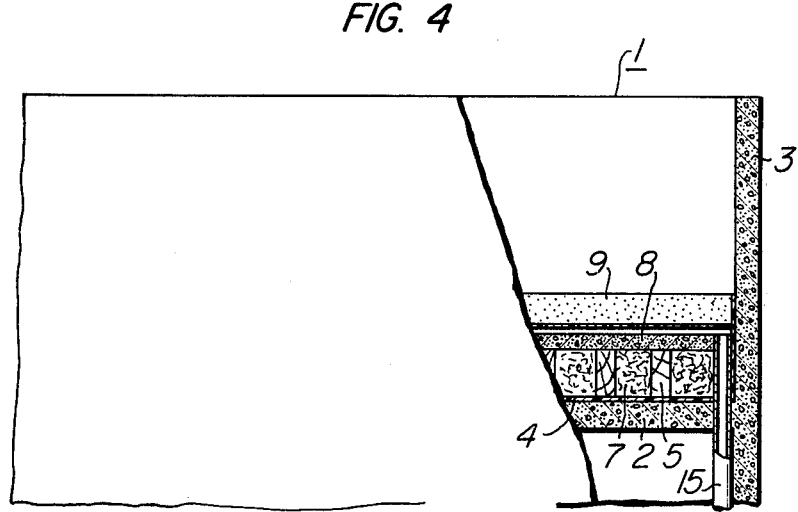
FIG. 4 is a fragmentary vertical sectional view of the roof-garden shown in FIG. 1.

The roof-garden according to the invention will now be described with reference to an embodiment shown in the accompanying drawings. A sheet of vinyl 4 is spread on a slabbed floor 2 of a roof 1 of a building and extends along inner surfaces 3 of walls of the building up to a certain level above the slabbed floor 2. The sheet of vinyl 4 may suitably be formed by heat welding the lap jointed edges of a plurality of sheets of vinyl. A large number of wooden blocks 5 of a rectangular parallelepiped shape are arranged in a plurality of suitably spaced-apart rows on the sheet of vinyl 4, with the wooden blocks 5 of the two adjacent rows being arranged in staggered relationship and the wooden blocks 5 of each row being spaced apart from one another for a suitable distance, so as to provide on the vinyl sheets 4 a space 6 having the wooden blocks 5 arranged in a complicated pattern. Leaf mold in which chemical fertilizers are incorporated is filled in the space 6 up to the height of each wooden block 5, so as to provide a first earth layer or a leaf mold layer 7 having the wooden blocks 5 scattered therein. Concrete is deposited on the upper surface of the leaf mold layer 7 to provide an upper concrete layer 8. Earth is placed on the upper concrete layer 8 at suitable heights to form flat and elevated parts to provide a second or a garden earth layer 9. Trees and shrubs 10 are planted, mosses are grown and a tea house 11 is provided on the garden earth layer 9. On the garden earth layer 9, garden-stones 14 may be placed, a garden-lantern 13 may be arranged and a pond 12 may be provided for carps to swim in. A fountain may be provided in the pond 12 to provide an artificial jet of water. Benches, chairs and tables may be arranged in suitable positions and paths may be formed suitably on the garden earth layer 9 to enable one to take a walk at will in the roof-garden. Inside the tea house 11, a scroll picture is hung and arranged flowers or a potted-plant is placed in the alcove. In this way, the roof-garden is laid out as a Japanese-style garden. Drain pipes 15 may be mounted in suitable positions in the roof-garden to drain from the garden earth layer 9 rainwater that has seeped therethrough.

The roof-garden according to the invention is constructed as aforesaid. The trees and shrubs 10 planted in the garden earth layer 9 have their roots spread deep and wide in the garden earth layer 9 with time, and in a few years the roots melt and break the upper concrete layer 8 with acids issuing from the roots, so that the roots extend into the leaf mold layer 7. The roots absorb nourishments from the leaf mold mixed with chemical fertilizers in the layer 7, with the result that the trees and shrubs 10 can grow vigorously. Since the leaf mold layer 7 is formed in the space 6 which contains the wooden blocks 5 arranged in a complicated pattern, the roots spreading into the leaf mold layer 7 surround the wooden blocks 15 and entwine the same in a complex manner, so that the roots are fastened deep into the leaf mold layer 7. Thus the trees and shrubs 10 are as firm as rocks and will not fall down or lean to one side even if a strong wind blows. The provision of the vinyl sheets 4 on the slabbed floor 2 of the roof 1 eliminates the possibilities of the roots of the trees and shrubs 10 extending to the slabbed floor 2 and inner wall surfaces 3 of the building.

According to the present invention, the roof of a building is laid out as a Japanese-style garden, by placing garden earth thereon, planting trees and shrubs in the garden earth, and providing a tea house and pond thereon. The roof-garden according to the invention offers the advantages of enabling one to enjoy better surroundings and fresher air than parks on the ground. Moreover, since the roof-garden is sunny, it is good for health to relax therein. The trees and shrubs in the roof-garden assimilate carbon dioxide and releases fresh oxygen, and the trees, shrubs and pond generate water vapor. Thus the air in the roof-garden is fresh and lacks impurities and contains a suitable degree of moisture, and is as clear and invigorating as mountain air. If one takes rest in the roof-garden, one's mental health and physical health will be increased and one's body will be invigorated. Thus the roof-garden according to the invention is the best place for persons to relax in and store up their energies after being released from a day's work, and the healthiest place for members of a family or close friends to gather together to enjoy one another's company. The roof-garden according to the invention can achieve the excellent effects of markedly improving the health of people who have been subjected to environmental pollution and disruption.

The roof-garden according to the invention is a boon to citizens of large cities who are forced to live in unhealthy environments.

This invention enables unutilized roofs of buildings to be utilized effectively throughout the four seasons of the year by laying out a roof-garden on each one of them. A roof-garden provides a driving force for the development of industries, thereby greatly contributing to the progress in the development of industries.

Various modifications in structure and/or function can be made in the disclosed embodiments without departing from the scope of the invention as defined by the claims.

What is claimed is:

1. A roof-garden comprising:
   a sheet of vinyl spread on a slabbed floor of a roof of a building and extending along inner surfaces of walls of the building up to a certain level above the slabbed floor;
   a plurality of wooden blocks arranged in a plurality of suitably spaced-apart rows on the vinyl sheet covered floor in such a manner that the wooden blocks of the two adjacent rows are arranged in staggered relationship and wooden blocks of each row are spaced apart from one another for a suitable distance;
   a first earth layer formed in a space containing the wooden blocks;
   an upper concrete layer provided on said first earth layer;
   a second earth layer formed on said upper concrete layer; and
   trees and shrubs planted in said second earth layer.

2. A roof-garden as set forth in claim 1, wherein said upper concrete layer is penetrable by roots of said trees and shrubs.

3. A roof-garden as set forth in claim 1, wherein said first earth layer is a leaf mold layer mixed with chemical fertilizers.

4. A roof-garden as set forth in claim 1, further comprising drain pipes opening in an upper surface of said upper concrete layer.

5. A roof-garden as set forth in claim 1, further comprising a tea-house, garden-stones and the like provided on said second earth layer, so that the roof-garden is laid out as a Japanese-style garden.

* * * * *